(12) United States Patent
Minami (10) Patent No.: US 7,170,846 B2
(45) Date of Patent: Jan. 30, 2007

(54) LIGHT RECEIVING AND EMITTING UNIT AND OPTICAL PICKUP USING THE SAME

(75) Inventor: Koji Minami, Gose (JP)

(73) Assignee: Sharp Kabushiki Kaisha, Osaka (JP)

( * ) Notice: Subject to any disclaimer, the term of this patent is extended or adjusted under 35 U.S.C. 154(b) by 579 days.

(21) Appl. No.: 10/746,328

(22) Filed: Dec. 23, 2003

(65) Prior Publication Data

US 2005/0073936 A1 Apr. 7, 2005

(30) Foreign Application Priority Data

Dec. 24, 2002 (JP) ............................. 2002-372889

(51) Int. Cl.
*G11B 7/00* (2006.01)
(52) U.S. Cl. ........................... 369/112.02; 369/112.19; 369/112.21
(58) Field of Classification Search ..................... None
See application file for complete search history.

(56) References Cited

U.S. PATENT DOCUMENTS

| 5,621,714 | A  | * | 4/1997 | Kobayashi et al. .... | 369/110.03 |
| 6,122,242 | A  | * | 9/2000 | Tsuchiya et al. ............ | 369/118 |
| 6,504,811 | B1 | * | 1/2003 | Morimoto ............... | 369/110.03 |
| 6,556,532 | B2 | * | 4/2003 | Ogawa et al. .......... | 369/112.16 |
| 6,580,674 | B1 | * | 6/2003 | Nishiyama et al. .... | 369/112.01 |
| 6,618,343 | B1 | * | 9/2003 | Saitoh et al. .......... | 369/112.01 |

FOREIGN PATENT DOCUMENTS

JP  2001-101703  4/2001

OTHER PUBLICATIONS

Gahagan, et al., "Integrated electro-optic lens/scanner in a LiTaO$_3$ single crystal", Applied Optics, vol. 38, No. 7, Mar. 1, 1999, pp. 1186-1190.

* cited by examiner

*Primary Examiner*—William Korzuch
*Assistant Examiner*—Tawfik Goma
(74) *Attorney, Agent, or Firm*—George W. Neuner; David G. Conlin; Edwards Angell Palmer & Dodge LLP (57) ABSTRACT

A light receiving and emitting unit has a plurality of light sources, a light receiving element, a light control unit, and an optical block. The optical block has at least a first and a second member formed of a material having birefringent property, and a third member interposed between the first and the second member and formed of a material having lower refractive index than the first and the second members. The light control unit has a crystal thin plate, a pair of electrodes formed on the surfaces of the crystal thin plate so as to sandwich the crystal thin plate for applying a voltage to the voltage application area, and a first and a second insulating member for sandwiching the crystal thin plate so as to cover the electrodes.

7 Claims, 7 Drawing Sheets

CROSS-SECTION
TAKEN ALONG the line A-A in Fig. 1

CROSS-SECTION
TAKEN ALONG the line A-A in Fig. 5

LIGHT RECEIVING AND EMITTING UNIT AND OPTICAL PICKUP USING THE SAME

CROSS-REFERENCE TO RELATED APPLICATION

This application is related to Japanese patent application No. 2002-372889 filed on Dec. 24, 2002 whose priority is claimed under 35 USC §119, the disclosure of which is incorporated by reference in its entirety.

BACKGROUND OF THE INVENTION

1. Field of the Invention

The present invention relates to a light receiving and emitting unit constituting an optical system of an optical pickup, in which beams emitted from at least two light sources having different wavelengths are collected on an optical recording medium, and the returned beams from the optical recording medium are received, and then recorded on and reproduced from an optical recording medium, more specifically, an optical disk of a different standard.

2. Description of Related Art

In order to downsize a light receiving and emitting unit, a reduction of the number of output lines of the light receiving and emitting unit is one of the effective methods. It is also applied to the light receiving and emitting unit having a plurality of light sources of different wavelengths.

Figure 10:
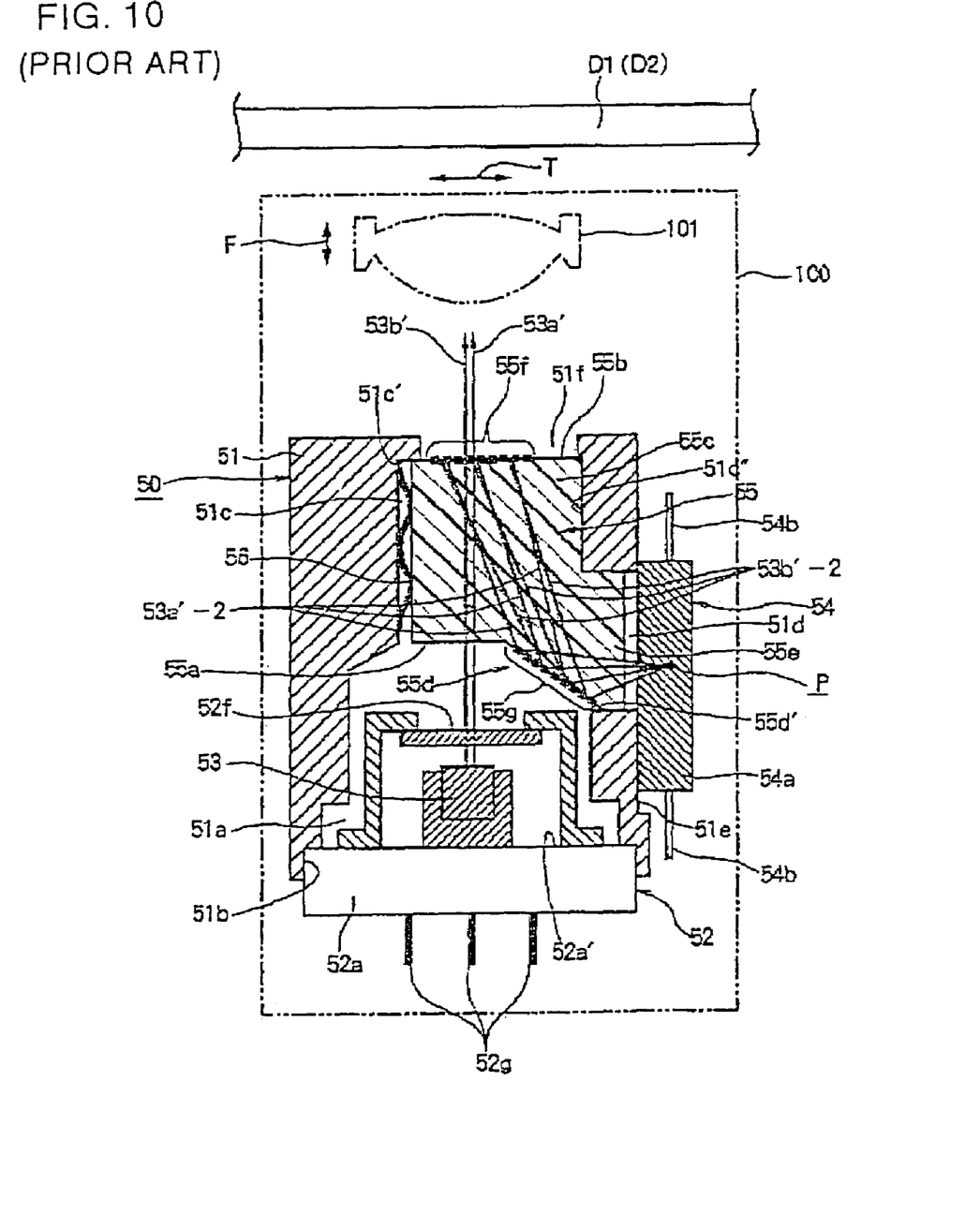
FIG. 10 is a cross-sectional view showing an example of the light receiving and emitting unit in the related art.

FIG. 10 is a cross sectional view of an optical pickup having a complex optical unit disclosed in Japanese Patent Unexamined Publication No. 2001-101703 (Document 1).

In this document 1, emitted beams from a plurality of light sources (three in the drawing) of different wavelengths are illuminated onto an optical disk D1 (D2), and the returned beams are guided to a predetermined light receiving position on a single light receiving element using two diffraction gratings. Since the angle of diffraction varies depending on the wavelength, the three returned beams each having different wavelengths are diffracted in the three directions at one of the diffraction grating 55f. However, by disposing the other diffraction grating 55d, a difference in the angle of diffraction may be corrected. At the diffraction grating 55d, three beams each having different wavelengths are diffracted again at different angles depending on the wavelength so as to cancel misalignment of the directions of the diffraction grating 55f and guided to a predetermined position of a light receiving element 54.

It is also known in the art that the effects of variations in wavelength are cancelled by applying the above-described technology in which two diffraction gratings are used to correct the difference in diffraction angle.

There is also a known method in which the positions of the light sources are shifted in order to reduce the number of the diffraction gratings to one, and beams from the light sources are obliquely incident onto the diffraction grating at different angles according to their wavelengths (usually they are incident perpendicularly thereto), thereby canceling misalignment of the angles of diffraction for each wavelength.

In order to construct a light receiving and emitting unit to be used for an optical pickup, it is necessary to diverge the optical paths of beams emitted from the light sources and the optical paths of beams returned to the light receiving element. The same is true for the light receiving and emitting unit of multiple wavelengths in which a plurality of light sources of different wavelengths are used.

In the case of the light receiving and emitting unit in the above-described document 1, part of the returned beams from the optical disk is diffracted to the desired directions and guided to the light receiving element by a diffraction grating in order to diverge the optical paths of the beams emitted from the light source and the optical paths of the beams returned to the light receiving element.

In Document 2 (Integrated electro-optic lens/scanner in a $LiTaO_3$, single crystal, APPL. OPT./Vol.38, No.7, p.1186-p.1190[1999]), a device having a light deflecting function and a lens effect by electro-optic effects is disclosed. In this light control device, beams can be collected at a desired position or be deflected at a varying direction without performing mechanical alignment. Since diffraction phenomena are not utilized, deterioration of the performance due to wavelength is prevented.

Figure 11:
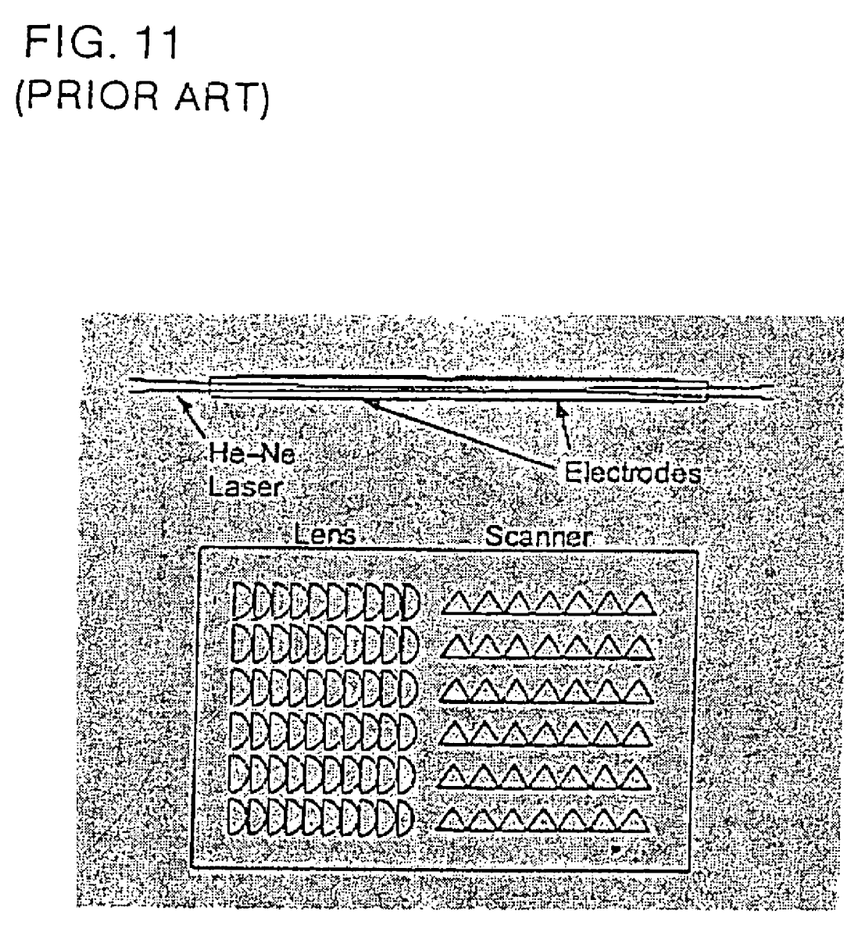
FIG. 11 is a drawing illustrating an example of the light control device in the related art.

FIG. 11 shows the light control device presented in the document 2 described above.

In this light control device, there is a difference in a refractive index between the area of lens shape and its surrounding area through the application of a voltage by forming a domain inverted construction (construction in which the direction of deflection is inverted) in triangular shape or lens shape. As shown in FIG. 11, electrodes are formed directly on a crystal thin plate, which is formed of $LiTa_2O_5$.

As is described above, in a light receiving unit, it is necessary to diverge the emitted beam from the light source and the returned beam to the light receiving element, and in the technology presented in document 1, diffraction is utilized. However, in the light receiving and emitting unit in document 1, it is difficult to achieve 100% of diffracting efficiency of the diffracted wave at a diffraction order in which the beam can be diffracted to a desired direction. In other words, when the required diffraction order is the first diffraction, minus first diffraction also occurs, and thus unnecessary diffracted beams tend to be stray beams.

Since the incidence points of the optical signals on the light receiving element, which are detected by the light receiving element, may vary due to variations in wavelength, signal detecting operation of the light receiving and emitting unit may be unstable. In addition, since the incidence points of the signal light (detected by the light receiving element) vary due to variations in wavelength, the signal light detected by the light receiving element is affected thereby.

On the other hand, when the light receiving and emitting unit is constructed using the refracting effect, effect of stray light or the effect of variations in wavelength may significantly be eliminated. However, only by diverging the optical paths using the refracting effect, beams after divergence of the optical path cannot be controlled.

In addition, since astigmatism, which occurs when the optical path is diverged, cannot be eliminated from the beam emitted from the light receiving and emitting unit, astigmatism remains as it is.

Furthermore, mechanical adjustment of the incidence points on the light receiving element is necessary when assembling of the light receiving and emitting unit in either configuration using diffraction or refraction for diverging the beams. However, in this case, when attempt is made to adjust the incidence points for beams of a plurality of wavelengths, the diffracting angle may be changed subtly according to the wavelength due to the influence of the manufacturing error of the diffraction grating, or the direction of refraction may be changed subtly due to machining errors of the member for refraction. Therefore, it is difficult to adjust the incidence points to the suitable positions for beams of all wavelengths.

On the other hand, it is conceivable that the light control device shown in the aforementioned document 2 is employed as a light control unit in the light receiving and emitting unit, and that the beam is collected or guided to a desired position for every wavelength. In this case, it may be considered that the necessity of mechanical position adjusting process may be simply eliminated. However, when the above-described device is introduced into the light receiving and emitting unit as it is, the following problems may arise.

In the case of the light receiving and emitting unit, since the inward beam and the outward beam pass the same light control unit, it is necessary to allow the beam to pass through a crystal thin plate, which corresponds to the light control unit, both on the inward and outward routes without loss of light. There is also a requirement to reduce the thickness of the crystal thin plate so as to increase efficiency of light control in the crystal thin plate. In this case, when the crystal thin plate is too thin, mechanical adjustment of the position of the light control unit itself is necessary for allowing the beam to pass therethrough both on the outward and inward routes, and thus mechanical alignment cannot be eliminated when manufacturing the multi-wavelength light receiving and emitting unit. In addition, an increase in thickness of the crystal thin plate only for eliminating the mechanical alignment for both of the outward and inward routes directly leads to the deterioration of performance of the light control unit.

In addition, when attempt is made to bring the device into contact with the same member which only serves to refract the beam for use, the member to be contacted also has an electro-optic effect. Thus, a voltage applied to the device disadvantageously affects to the portion which does not need to be controlled (that is, the same member described above).

In an example in document 1 described above, a light source is located at a position away from the area where a voltage for controlling the optical path is applied (voltage applied portion). However, when the light source is placed in the vicinity of the crystal thin plate, application of a voltage, which is irrelevant to a control of the light source, is performed in the vicinity of the light source. Therefore, when a semi-conductor laser is used as a light source, there arise a necessity of another countermeasure for a problem in that laser destruction may be resulted due to voltage application such as electrostatic induction.

SUMMARY OF THE INVENTION

The present invention provides a light receiving and emitting unit constituting an optical pickup optical system in which emitted beams from a plurality of light sources of different wavelengths are collected on an optical recording medium, and the returned beams from the optical recording medium are received, and then recorded on and reproduced from an optical recording medium; including the above-mentioned plurality of light sources; a light receiving element; a light control unit including a voltage application area which allows emitted beams from the plurality of light sources to pass through first, constitutes part of optical paths of the emitted beams from the light sources and the optical paths of the returned beams from the optical recording medium, and controls at least one of the optical paths of the returned beams independently; and an optical block being in contact with the light control unit for allowing the emitted beams from the plurality of light sources to pass therethrough after having passed through the light control unit for guiding the optical paths of the emitted beams toward the optical recording medium, and diverging the optical paths of the returned beams from the optical recording medium from the optical paths of the emitted beams and guiding toward the light control unit; the optical block including at least a first, a second, and a third members, the first and the second members being formed of a material having birefringent property, the third member being interposed between the first and the second members and formed of a material having lower refractive index than the first and the second members, the light control unit including a crystal thin plate having a plurality of refracting areas formed therein, the plurality of refracting areas exhibit refractive indexes different from the surrounding area when a voltage is applied to a voltage application area, a pair of electrodes formed on the surfaces of the crystal thin plate so as to sandwich the crystal thin plate for applying a voltage to the voltage application area, and a first and a second insulating members for sandwiching the crystal thin plate so as to cover the electrodes.

DESCRIPTION OF THE PREFERRED EMBODIMENTS

In view of such circumstances, it is an object of the present invention to provide a multiple wavelength light receiving and emitting unit in which utilization of performance of the light control unit, which includes a crystal thin plate having an electro-optic effect, is maximized, positional adjustment of the light control unit itself is eliminated, whereby the mechanical adjustment of the position at the time of manufacturing of the light receiving and emitting unit is eliminated, and the light control unit is constructed to prevent a voltage applied to the light control unit from affecting other components in the light receiving and emitting unit.

In order to solve the problem described above, the present invention provides a light receiving and emitting unit constituting an optical pickup optical system in which emitted beams from a plurality of light sources of different wavelengths are collected on an optical recording medium, and the returned beams from the optical recording medium are received, and then recorded on and reproduced from an optical recording medium; including the above-mentioned plurality of light sources; a light receiving element; a light control unit including a voltage application area which allows emitted beams from the plurality of light sources to pass through first, constitutes part of optical paths of the emitted beams from the light sources and the optical paths of the returned beams from the optical recording medium, and controls at least one of the optical paths of the returned beams independently; and an optical block being in contact with the light control unit for allowing the emitted beams from the plurality of light sources to pass therethrough after having passed through the light control unit for guiding the optical paths of the emitted beams toward the optical recording medium, and diverging the optical paths of the returned beams from the optical recording medium from the optical paths of the emitted beams and guiding toward the light control unit; the optical block including at least a first, a second, and a third members, the first and the second members being formed of a material having birefringent property, the third member being interposed between the first and the second members and formed of a material having lower refractive index than the first and the second members, the light control unit including a crystal thin plate having a plurality of refracting areas formed therein, the plurality of refracting areas exhibit refractive indexes different from the surrounding area when a voltage is applied to a voltage application area, a pair of electrodes formed on the surfaces of the crystal thin plate so as to sandwich the crystal thin plate for applying a voltage to the voltage application area, and a first and a second insulating members for sandwiching the crystal thin plate so as to cover the electrodes.

In other words, the light control unit is able not only to change the direction of travel of the returned beams from the optical recording medium or to change astigmatism, but also to allow the emitted beams from the light sources to pass therethrough efficiently and to guide the returned beams from the optical recording medium to the light receiving element at high efficiency while keeping the thickness of the crystal thin plate of the light control unit at a desired value, or without lowering sensitivity of the light control unit with respect to variations in voltage, since the first insulating member or the second insulating member serves as a positional reference of the optical block constructed of the light sources, the light receiving element, or the plurality of materials. Accordingly, necessity of positional adjustment of the optical block constructed of the light sources, the light receiving element, or the plurality of materials before fixation may be eliminated.

Since the first insulating member or the second insulating member isolate the light sources and the optical block from the voltage application area (electrodes and a feeder unit that will be described later), in the light receiving and emitting unit, the light sources and the optical block may be prevented from being affected by the voltage applied for obtaining electro-optic effect.

In addition, beams of any wavelength may be guided to the predetermined incidence points on a single light receiving element by adjusting the amount of astigmatism of beams directed to the light receiving element while satisfying the above described conditions, and changing the beam shape of the beams at the moment when the beams are incident into the light receiving element to a desired shape.

As detailed embodiments of the present invention, the following respective components will be described.

The optical block includes at least three parallel plates, that is, a first and a second parallel plates formed of an identical crystal material having birefringent property as well as electro-optic effect, a third parallel plate formed of a material having a lower refractive index than the crystal material and interposed between the first parallel plate and the second parallel plate, a crystal member being in contact with the parallel plates on the side far from the light sources and being formed of the same material as the first and the second parallel plates but different only in optical axis, and a quarter-wave plate. With the provision of the quarter-wave plate, direction of deflection of a beam directing from the light source to the recording medium (emitted beam) differs from that of a beam returning from the recording medium to the light receiving element (returned beam). Therefore, for example, since the third parallel plate is included in the three parallel plates, refraction of the third parallel plate works in the direction to eliminate the astigmatism which occurs in the first and the second parallel plates for the emitted beam and works in the direction to increase the astigmatism for the returned beam (the converse is also possibly ture, as a matter of course). As a consequence, the light beam is kept free from the astigmatism which is not necessary for recording into or reproducing from the recording medium while the beam is in the stage of the emitted beam. Crystal materials such as $LiNbO_3$ and $LiTaO_3$ may be used for the first and the second members, and high-polymer materials having birefringent property may also be employed.

The light control unit may be formed of the same crystal material as the above-described first and second parallel plates but of a different crystal material only in optical axis, and may include a crystal thin plate formed of crystal material having a plurality of refracting areas therein which exhibit refractive index different from the surrounding area when a voltage is applied to the voltage application area, the first and second electrodes formed on the upper and lower surfaces of the crystal thin plate, and the first and second insulating members sandwiching the crystal thin plate in the direction substantially parallel with the direction of travel of the emitted beam from the light source so as to cover the first and second electrodes respectively except for the feeder unit.

In this invention, the light control unit is formed with holes respectively on the first insulating member and the second insulating member in the direction substantially perpendicular to the optical path of the returned beam, and a feeder unit for feeding electricity to the respective electrodes is connected to the respective electrodes through these holes. The feeder units for the electrodes may be formed to be relatively smaller in cross-section in comparison with the surface areas of the first insulating member and the second insulating member, and to be surrounded in these insulating members. Accordingly, the voltage applied portion, which may strongly affect the light sources, is effectively isolated from the light sources.

The light control unit may be constructed in such a manner that the direction of the optical axis of the crystal thin plate coincides with the direction of voltage application, and is perpendicular to the direction of deflection of the light source.

Accordingly, a high electro-optical effect with respect to the outward polarized light is obtained, so that a light control may be performed with high efficiency.

The light control unit may be constructed in such a manner that all the returned beams reflected from the optical recording medium travel along the identical optical path, the refracting area is constructed to have a lens effect, the light receiving element has a light receiving portion divided into four pieces, and the dividing direction may be substantially 45 degrees with respect to the direction of deflection of the emitted beam from the light source.

The beam shape at the moment when the beam is incident into the light receiving element may either be elongated in parallel with the direction of deflection or elongated in the direction perpendicular to the direction of deflection depending on whether the position of the light receiving element in the direction of the optical axis is located in front of the focal point or at the back of the focal point due to the astigmatism occurred spontaneously while the beam is emitted from the light source, irradiated on the optical recording medium, and incident into the light receiving element.

Here, by setting the direction of division to form about 45 degrees with respect to the direction of deflection of the emitted beam from the light source, the direction in which the beam shape is elongated due to the astigmatism also forms 45 degrees with respect to the dividing direction. Accordingly, the outputs from the different light receiving portions out of the divided light receiving portions increase in the vicinity of the focal point, and thus the focus error signal may be detected by the astigmatism method which utilizes the property that the beam shape in front of the focal point differs from that at the back thereof. In addition, the amount of astigmatism which occurs spontaneously while the beam is emitted from the light source, irradiated on the optical recording medium, and incident into the light receiving element can be controlled to a suitable value at the light control unit. The tracking error signal may also be obtained by the light receiving portion divided into four pieces. In addition, since the light control unit requires only slight control for adjusting the amount of astigmatism, a voltage to be applied to the light control unit can be reduced to a low level.

The construction may be such that the pair of electrodes includes a first electrode being in contact with the first insulating member, and a second electrode being in contact with the second insulating member, and at least one of the combination of the first insulating member and the first electrode being in contact with each other and the combination of the second insulating member and the second electrode may be formed of a transparent material.

In this arrangement, the returned beams are partially controlled while maintaining the loss of the beam passing through the light control unit at a low level, so that the beams are diverged into controllable beams and non-controllable beams. Therefore, the wave front splitting effect with high efficiency, which cannot be obtained in a case in which the diffraction grating is used, is achieved.

The light control unit may be constructed in such a manner that at least one of the interface between the first insulating member and the crystal thin plate and the interface between the second insulating member and the crystal thin plate is formed at the position crossing the light flux of the returned beams from the optical recording medium, and the light receiving portion of the light receiving element may have a parting line which is substantially parallel with the interface.

In this arrangement, the interface itself serves for diverging the returned beams, so that the detection of the focus error signal by the knife edge method or Foucault process may be performed with high efficiency.

Further, according to another viewpoint of the present invention, there is provided an optical pickup, in which a light condensing lens is built in the light receiving and emitting unit, for collecting the beams emitted from the two light sources onto the optical recording medium, and receiving the returned beams from the optical recording medium to perform recording and reproducing of the optical recording medium.

Referring now to the drawings, embodiments of the present invention will be described in details. The description shown below is not intended to limit the invention.

First Embodiment

Figure 1:
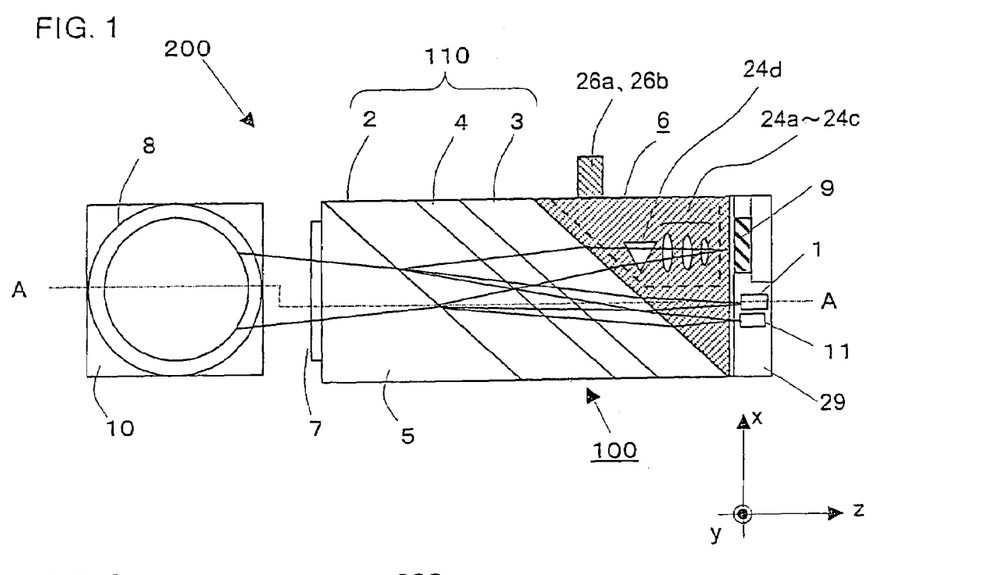
FIG. 1 is a plan view showing a construction of an optical pickup according to an embodiment of the present invention.
Figure 2:
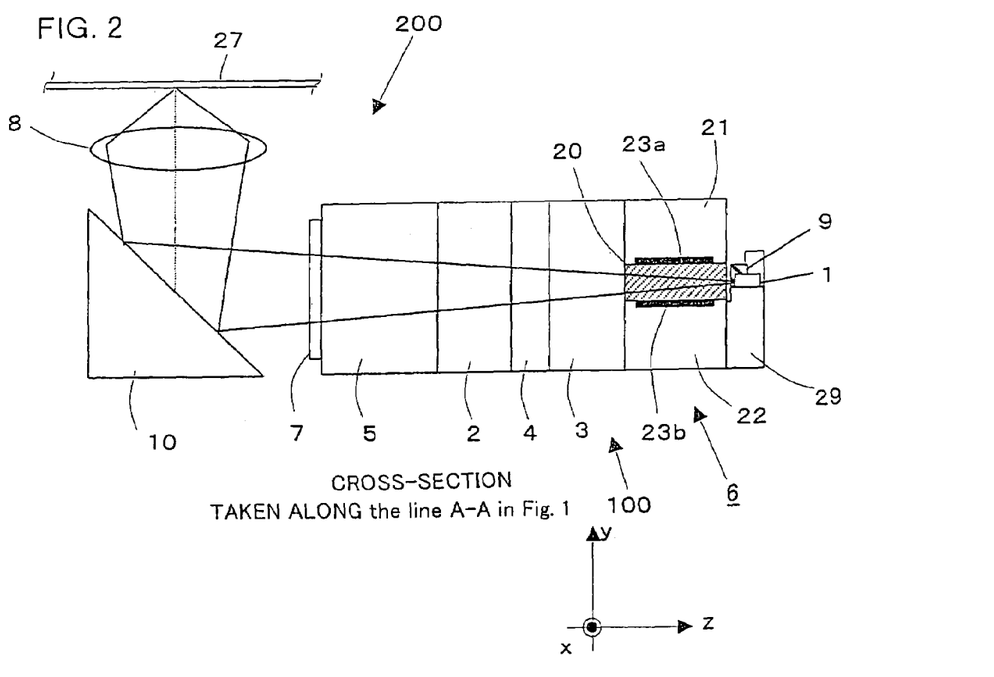
FIG. 2 is a cross sectional view taken along the line A—A in FIG. 1.

FIG. 1 is a plan view showing a construction of an optical pickup according to an embodiment of the present invention, and FIG. 2 is a cross sectional view taken along the line A—A in FIG. 1.

In FIG. 1 and FIG. 2, an optical pickup 200 includes a light receiving and emitting unit 100, a mirror 10, and an objective lens 8, and information can be recorded in, or reproduced from, an optical disk 27.

The light receiving and emitting unit 100 includes two light sources 1 (a light source with a wavelength of $\lambda 1$) and 11 (a light source with a wavelength of $\lambda 2$), a light receiving element 9, an optical block 110, and a light control unit 6. When x, y, z coordinates are determined as shown in FIG. 1, the direction of deflections of the light sources 1 and 11 are both x-direction.

The light source 1 and the light source 11 may be, for example, semiconductor lasers.

The optical block unit 110 includes a first parallel plate 2 (first member), a second parallel plate (second member) 3, a third parallel plate (third member) 4, a crystal member 5 in the shape of triangle pole disposed in contact with the first parallel plate 2, and a quarter-wave plate 7.

The first parallel plate 2 and the second parallel plate 3 are formed of crystal material having an electro-optic effect and a birefringent property. The crystal material may be, for example, $LiNbO_3$ (ne=2.289, no=2.202, $\lambda$=650 nm).

The optical axis of $LiNbO_3$ constituting the first parallel plate 2 and the second parallel plate 3 extends in the y-direction in FIG. 1. The third parallel plate 4 interposed between the first parallel plate 2 and the second parallel plate 3 is isotropic glass having a refractive index (ni) of 2.0. In addition, material of the crystal member 5 in the shape of a triangle pole is $LiNbO_3$ having an optical axis in the x-direction in FIG. 1.

In the optical block 110, a beam emitted from the light source 1 is refracted at an interface between a light control unit 6 which has a three-layer structure in the y-direction (described later) and the second parallel plate 3, an interface between the second parallel plate 3 and the third parallel plate 4, an interface between a third parallel plate 4 and a first parallel plate 2, and an interface between the first parallel plate 2 and the crystal member 5, respectively, and thus the optical path is shifted in the x-direction. Here, by disposing the third parallel plate 4 so as to be interposed between the first parallel plate 2 and the second parallel plate 3, deflection of the optical paths on the inward route of the light receiving and emitting unit 100 is directed to cancel the astigmatism.

Figure 3:
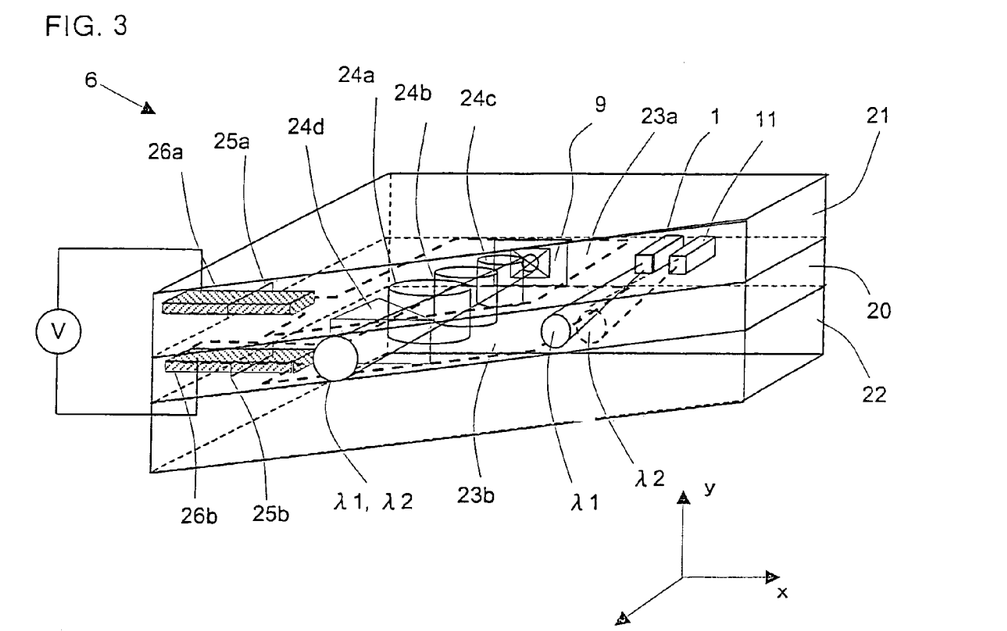
FIG. 3 is a perspective view of the light receiving and emitting unit of an optical pickup in FIG. 1.

Subsequently, the light control unit 6 will be described. FIG. 3 is a perspective view of the light control unit 6.

The light control unit 6 includes a crystal thin plate 20 formed of $LiNbO_3$ having an optical axis in the same direction as the crystal member 5, a first electrode 23a and a second electrode 23b formed on the upper and lower surfaces of the crystal thin plate 20, and a first insulating member 21 and a second insulating member 22 for covering the first electrode 23a and the second electrode 23b, respectively, and constitutes a three layer structure of the first insulating member 21, the crystal thin plate 20, and the second insulating member 22. The first insulating member 21 and the second insulating member 22 may be formed, for example, of glass.

Figure 4:
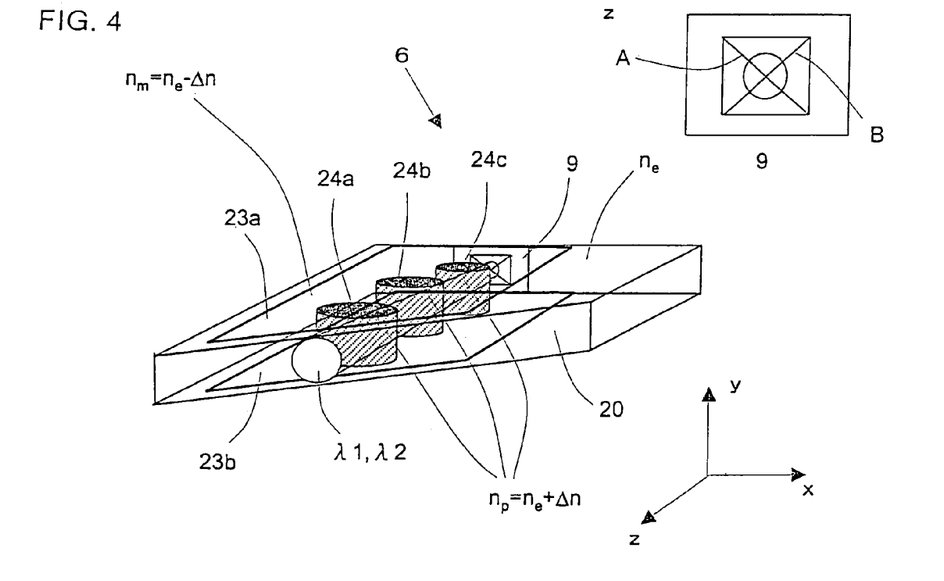
FIG. 4 is a perspective view of the crystal thin plate in FIG. 3.

FIG. 4 is a perspective view of the crystal thin plate 20.

As shown in FIG. 4, the crystal thin plate 20 is formed with a domain inverted area in which the direction of polarization is partly (uniformly in the y-direction) inverted so as to generate partial refracting effect when a voltage is applied to the electrodes 23a, 23b. The domain inverted area corresponds to a refracting area. In FIG. 4, refracting areas 24a, 24b, 24c, 24d (24d is shown only in FIG. 3 and omitted in FIG. 4) are formed, and the signs of the change of refractive index Δn occurred in $LiNbO_3$ by being applied with a voltage are opposite between the refracting area (refractive index $n_p$) and other area (refractive index $n_m$), and the difference of refractive index of 2Δn is obtained in the interface. By setting the magnitude of the value Δn and the shape of the refracting area as needed, the beam passing through the light control unit 6 may be bent or the wave front thereof may be converted.

As shown in FIG. 3, in the light control unit 6, the first insulating member 21 and the second insulating member 22 are formed with holes 25a, 25b for connecting the first electrode 23a and the second electrode 23b with feeder units 26a, 26b, respectively.

The holes 25a, 25b are formed on the first insulating member 21 and the second insulating member 22 so as to extend substantially perpendicularly to the optical path, respectively.

As a result of such arrangement of these feeder units 26a, 26b, the feeder units 26a, 26b in cross-section are relatively smaller than the surface areas of the first insulating member 21 and the second insulating member 22, and are surrounded in these insulating members. Therefore, the voltage applied portion (the electrodes and the feeder units) to the light control unit 6, which may strongly affect the light sources 1, 11, is effectively isolated from the light sources 1, 11. In addition, voltage control may be applied adequately only to the light control unit 6 without affecting the crystal member 5, the first parallel plate 2, and the second parallel plate 3 shown in FIG. 1 and FIG. 2.

A principle of light detection in the optical pickup 200 will be described below.

It is assumed that direction of deflection of the emitted beams from the light sources 1, 11 is determined to be the x-direction.

Since the direction of deflection of a linearly polarized light emitted from the light source 1 or the light source 11 and emitted from the crystal member 5 is the x-direction, the polarized light is circularly deflected at the quarter-wave plate 7 and irradiated on the optical disk 27. When it is reflected from the optical disk 27, it is changed into the linearly polarized light in the y-direction. Therefore, the optical path of the beam directed to the optical disk 27 is different from the optical path of the returned beam from the optical disk 27, and only the returned beam is guided to the light receiving element 9. In other words, by providing the first electrode 23a and the second electrode 23b only partially on the crystal thin plate 20 through which the returned beam passes through (See FIG. 3), the refractive index of the portion other than the portion that performs optical control is kept at ne (See FIG. 4), and thus the optical control unit 6 controls only the returned beam after having irradiated the optical disk 27. The optical axis of the crystal thin plate 20 in the light control unit 6 extends in the direction in which the electro-optic effect is maximized for the polarized light in the y-direction.

In addition, according to the principle shown below, the emitted beam from the light source 1 or the light source 11 may be returned to the substantially the same position on the light receiving element 9. For example, when the wavelength λ1 of the light source 1 is 650 nm, and the wavelength λ2 of the light source 11 is 405 nm, the distance of the beam emitted from the light source 11 is larger in the x-direction from the light receiving element 9 than the beam emitted from the light source 1. Therefore, by shifting the position of the light source 11 slightly in the x-direction (the direction away from the light receiving element 9) with respect to the light source 1, the returned beams of the beam with a wavelength of λ1 and of the beam with a wavelength of λ2 are guided to the substantially the same positions on the light receiving element 9.

In the optical pickup 200, however, in order to secure the servo signal detecting performance of the light receiving and emitting unit 100, finer light control to the light receiving element 9 is required. In this case, by disposing the optical path changing mechanism as described below in the light control unit 6, the returned beams of the beam with a wavelength of λ1 and the beam with a wavelength of λ2 are ensured to be returned to a predetermined position on the light receiving element 9 even when the light source 1 and the light source 11 are arranged without performing mechanical positional adjustment.

A further detailed method for allowing the returned beams of the beam with a wavelength of λ1 and the beam with a wavelength of λ2 to be returned to a predetermined position on the light receiving element 9 accurately will be described below.

In the light control unit 6, since the first insulating member 21 and the second insulating member 22 serve as positional reference of the optical block 110 constructed of the light source 1, the light receiving element 9, the first parallel plate 2 and the second parallel plate 3, the third parallel plate 4, and the crystal member 5, error relating to the mutual positional relationship among the optical block 110, the light source 1 with a wavelength of λ1, the light source 11 with a wavelength of λ2, and the light receiving element 9 in the light control unit 6 is reduced.

Therefore, the beam emitted from the light source 1 or the light source 11 can be passed through the light control unit 6 with high efficiency, and the returned beam directed to the light receiving element 9 can be guided with high efficiency while keeping the thickness of the crystal thin plate 20 of the light control unit 6 at a desired value, or without lowering sensitivity of the light control unit with respect to the applied voltage.

In this case, when the refracting area is formed in the light control unit 6, the refracting areas 24a to 24c in lens form obliquely is arranged with respect to the z-axis to some extent, or the triangular refracting area 24d is formed and different voltages according to the wavelength is applied or a voltage is not applied. Thereby electro-optic effect may be controlled, and the direction of travel of the returned beam from the optical disk 27 may be corrected so as to be irradiated at a predetermined position of the light receiving element 9. With such control, necessity of mechanical positional adjustment among the plurality of light sources with different wavelengths and the single light receiving element may be eliminated.

The astigmatism of the beams emitted from the light source 1 and the light source 11 may be removed by the first parallel plate 2 to the third parallel plate 4 respectively. However, for the returned beams from the optical disk 27, they pass through the quarter-wave plate again, and subsequently, return to the light receiving element 9 while generating astigmatism both in the beam with a wavelength of λ1 and the beam with a wavelength of λ2.

In this case, when the light receiving portion of the light receiving element 9 is divided into four pieces as shown in FIG. 4 and the parting lines A, B are set to form about 45 degrees with respect to the direction of deflection, the focus error signal due to astigmatism method can be detected without providing separate means for generating astigmatism, such as a cylindrical lens, when constructing the optical pickup 200 from the reason described above.

However, the astigmatism is not necessarily be adequate for detection of the focus error signal, and the magnitude thereof varies depending on the wavelength of the light source. Therefore, in the light receiving and emitting unit 100, the magnitude of the astigmatism or the direction of travel of the light is changed so that the refracting areas 24a to 24d in the light control unit 6 can detect the focus error signal.

By using the light receiving element 9 in the light receiving and emitting unit 100, the tracking error can be detected using the push-pull method when constructing the optical pickup 200.

Second Embodiment

Figure 5:
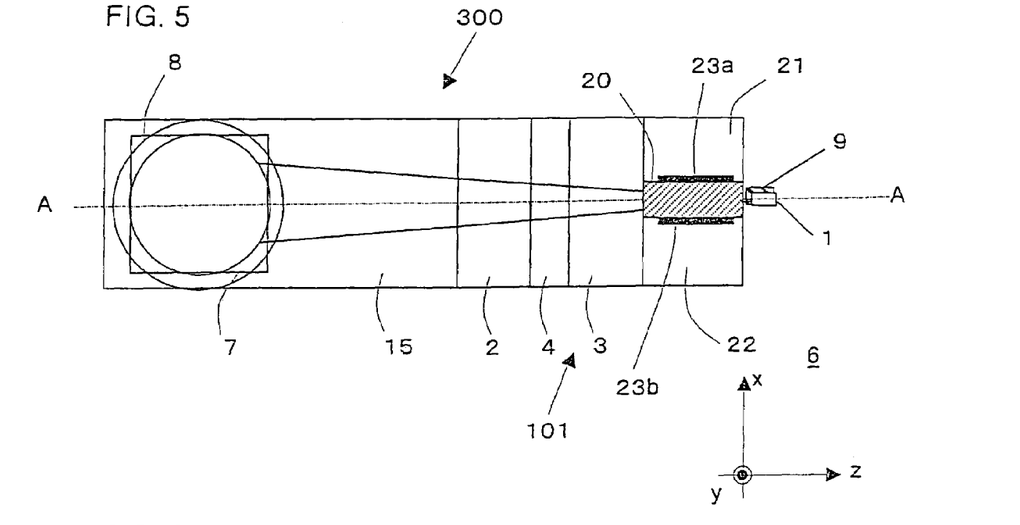
FIG. 5 is a plan view showing a construction of the optical pickup according to another embodiment of the present invention.
Figure 6:
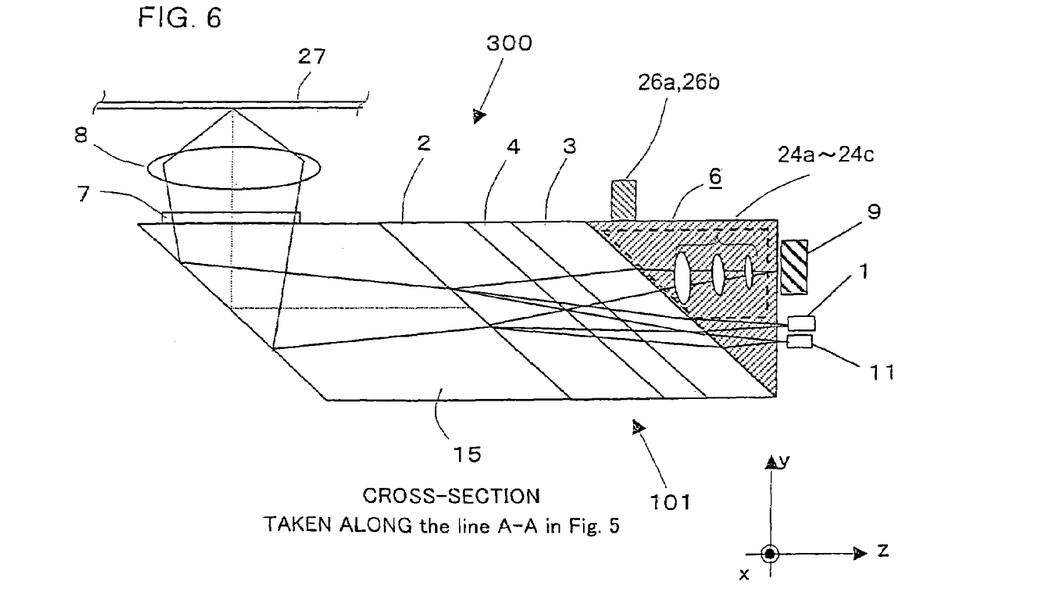
FIG. 6 is a cross-sectional view taken along the line A—A in FIG. 5.

FIG. 5 is a plan view showing a construction of the optical pickup according to another embodiment of the present invention. FIG. 6 is a cross sectional view taken along the cross section line A—A in FIG. 5.

The first embodiment is constructed in such a manner that the optical path of the beams emitted from the light sources 1, 11 and the optical path of the returned beam after having irradiated the optical disk 27 are horizontal. In contrast, in the second embodiment, a construction in such a manner that the beams emitted from the light sources 1, 11 are perpendicular to the optical path of the returned beams after having irradiated the optical disk 27 will be described.

In the construction in the second embodiment, since the mirror 10 used in the first embodiment and the crystal member 5 may be replaced by a crystal member 15 in the shape having a parallel plate, the crystal member and the mirror may be unitarily formed, and thus the construction of the optical pickup is further simplified.

In addition, the light source 1 and the light source 11 are arranged so that the direction of deflection of the beams emitted from the light source 1 and the light source 11 extends in the direction orthogonal to the direction of deflection of the emitted light from a light receiving and emitting unit 101, that is, in the y-direction. Accordingly, the direction of lamination of the light control unit will be the x-direction in the light receiving and emitting unit 101. Since the beams are emitted from the light receiving and emitting unit 101 in the y-direction, the quarter-wave plate 7 is disposed in parallel with the xz plane.

The construction of the light control units in the light receiving and emitting unit 100 and the light receiving and emitting unit 101 may be modified as follows.

Figure 7:
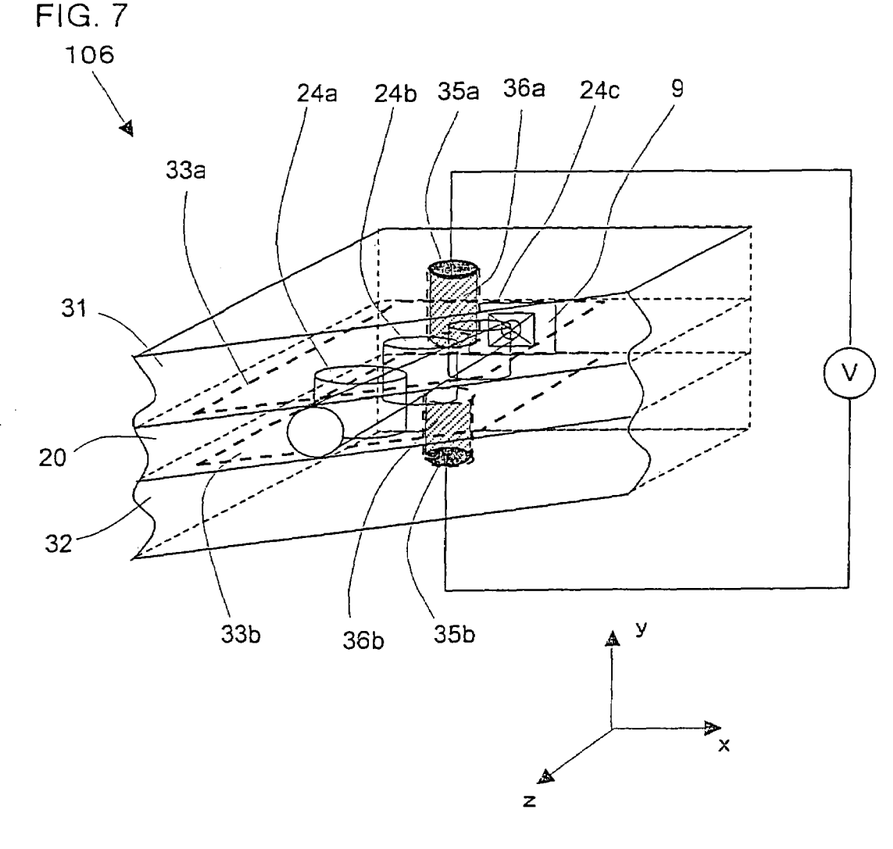
FIG. 7 is a perspective view showing a construction of the light control unit according to the second embodiment.

Referring now to FIG. 7, the construction of a light control unit 106 will be described below.

In the light control unit 106, electrode layers 33a and 33b are formed on the upper and lower surfaces of the crystal thin plate 20 having refracting areas 24a to 24c formed therein, and a first insulating member 31 and a second insulating member 32 sandwich the crystal thin plate 20 so as to cover the electrodes 33a, 33b. The first insulating member 31 is formed with a hole 35a, and the second insulating member 32 is formed with a hole 35b, respectively, so that the electrodes 33a, 33b may be connected to the exterior. Cylindrical feeder units 36a, 36b are formed at these holes 35a, 35b, and a voltage is applied to the electrodes 33a, 33b of the light control unit 106 via these feeder units 36a, 36b.

With the feeding method described above, the voltage applied portions (such as electrodes and feeder units) are located at the position significantly isolated from the light sources 1, 11 by the insulating material. Therefore, even when the light sources 1, 11 are positioned in the vicinity of the crystal thin plate, the light sources 1, 11 are completely isolated from the voltage applied portions and thus the light sources 1, 11 may be prevented from being affected by electrostatic induction that occurs when a voltage is applied.

For the beams of which the wavelengths of the returned beams are different from each other, such as λ1 (405 nm) and λ2 (650 nm), it is the same as the above-described embodiment in that the distance between the light sources 1, 11 and the thickness of the first parallel plate 2, the second parallel plate 3, and the third parallel plate 4 formed of crystal material are determined in advance so as to be returned to the same position on the light receiving element 9.

Third Embodiment

Figure 8:
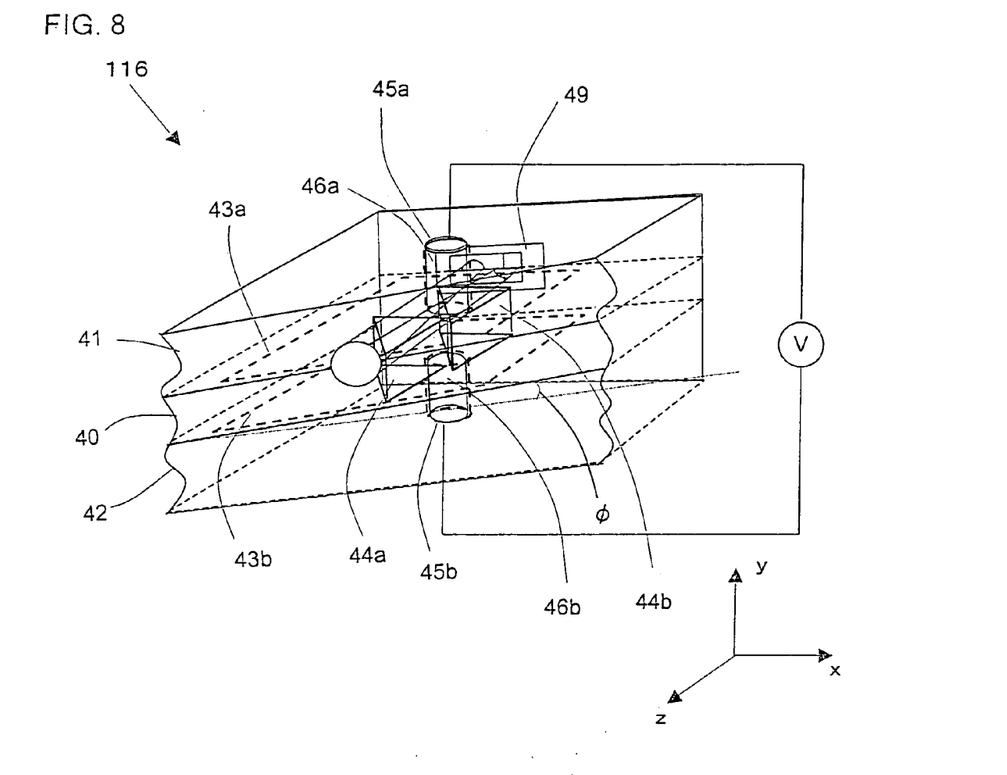
FIG. 8 is a perspective view of a light control unit according to the third embodiment.

FIG. 8 is a perspective view of a light receiving and emitting unit according to the third embodiment. Referring now to FIG. 8, a light control unit 116 will be described. In the third embodiment, since the construction other than the light control unit 116 is the same as the light receiving and emitting units 100, 101, only the light control unit 116 will be described.

The third embodiment is constructed not to allow all the beams to pass through a crystal thin plate 40, but allow part of beams therethrough, so that wave front splitting effect is obtained.

In other words, in the light control unit 116, both of a first insulating member 41 and a first electrode 43a are formed of transparent material, and thus the beams pass through both areas with the intermediary of the interface between the crystal thin plate 40 and the first insulating member 41. In this case, refractive indexes of the first insulating member 41 and the first electrode are set to the same value in order to prevent a loss due to reflection on the interface therebetween (However, these refractive indexes may not necessarily be completely the same, and may be slightly different with reference to the amount of reflection to be generated.).

When it is necessary that the beam passes through a feeder unit 45 as this embodiment, a feeder unit 46a may be formed of the same transparent material as the first electrode 43a. In the case where the feeder unit 46a can be disposed at the position other than the optical path, material of the feeder unit 46a may be any of transparent and opaque.

Since the refractive index of the crystal thin plate 40 and that of the first insulating member 41 are different from each other, the beam traveling in the crystal thin plate 40 travels in the different direction from the beam traveling in the first insulating member 41. Therefore, when the beams reached a light receiving element 49, the returned beam from the optical disk is diverged into two beams. In other words, since the beam passing through the light control unit 116 can be diverted into the controllable beam and the non-controllable beam without loss, wave front splitting effect can be achieved with an extremely small loss, unlike the wave front splitting effect obtained when a diffraction grating is used.

Figure 9:
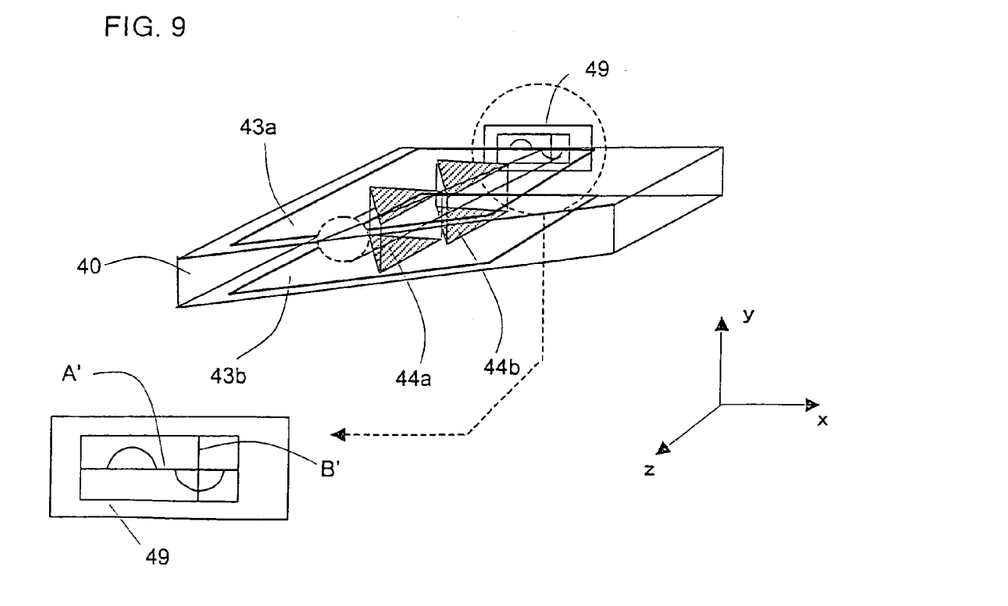
FIG. 9 is a perspective view illustrating a construction of the crystal thin plate in the light control unit.

In the optical pickup using the light control unit 116 in the third embodiment, as shown in FIG. 9, the focus error signals can be detected by Foucault process by detecting the returned beam at the light control unit 116 by the light receiving element 49 of which the light receiving portion has a parting line A' being substantially parallel with the interface between the crystal thin plate 40 and the first insulating member 41a. In this case, the split light receiving portions are designed into the size in which the wavelength $\lambda 1$ and the wavelength $\lambda 2$ can be incident, so that both of the beams with two different wavelengths, such as wavelength $\lambda 1$ and wavelength $\lambda 2$, may be received.

The light receiving element 49, the light receiving portion of which is a destination of the beam passing through the crystal thin plate 40, is divided into two pieces along a parting line B' extending orthogonally to the parting line A' described above and in substantially parallel with a track. Therefore, detection of the tracking error occurred when constructing the optical pickup can be achieved by the push-pull method. When no voltage is applied to the light control unit 116, the beam with a wavelength of $\lambda 1$ and the beam with a wavelength of $\lambda 2$ reach at the different positions. However, by controlling the direction of the optical path of at least one of the beam with a wavelength of $\lambda 1$ and the beam with a wavelength of $\lambda 2$ in refracting areas 44a, 44b in the shape of a triangle pole by applying a voltage on the light control unit 116, the beams having both wavelengths can be incident to the portion which extends equally across the parting line B'.

As descried in the embodiments shown above, in the respective light receiving and emitting units, the beam can be detected using the same light receiving and emitting element. In addition, even when a lens, such as the diffraction grating or a bulk, is not used for splitting the wave front, the servo signals can be generated, and thus increased light usability is achieved. When performing light control for guiding the beam to the light receiving element, such light control may be performed without affecting the function of an optical system and the action of a light source other than in the light control unit.

According to the present invention, the light control unit is capable of changing the direction of travel of the beam emitted from the light source and the returned beam from the optical recording medium or changing the astigmatism. And also it is capable that the beam emitted from the light source and the returned beam from the optical recording medium pass through the light control unit with high efficiency, while keeping the thickness of the crystal thin plate in the light control unit at a desired value, that is, without lowering sensitivity of the light control unit with respect to variations in voltage because the first insulating member or the second insulating member serves as a positional reference of the optical block constructed of a plurality of members including the light source and the light receiving element. Therefore, it is not necessary to secure the optical block constructed of a plurality of members including the light source and the light receiving member, while adjusting the positions with respect to each other when manufacturing the light receiving and emitting unit.

In addition, since the first insulating member or the second insulating member isolates the optical block constructed of a plurality of members including the light source and the crystal member from the voltage applied portion (electrodes or feeder units), the light source and the optical block is prevented from being affected by the voltage application in order to obtain the electro-optic effect. In addition, the beams of any wavelength can be guided to a predetermined incident position on the single light receiving element while adjusting the shape of the beam at the moment when the beams are incident into the light receiving element with the above-described conditions kept satisfied.

In addition, at constructing an optical pickup, when the principal approaches for detecting focus error signals such as the astigmatism method or Foucault process is employed, adjustment of the incident position of the beam onto the light receiving element can be performed easily in a state in which the applied voltage for obtaining the electro-optic effect are kept to a small value, and thus so-called the servo operation of the optical pickup can be performed effectively.

What is claimed is:

1. A light receiving and emitting unit constituting an optical pickup optical system in which emitted beams from a plurality of light sources of different wavelengths are collected on an optical recording medium, and the returned beams from the optical recording medium are received, and then recorded on and reproduced from an optical recording medium; comprising:

the plurality of light sources;

a light receiving element;

a light control unit including a voltage application area which allows emitted beams from the plurality of light sources to pass through first, constitutes part of optical paths of the emitted beams from the light sources and the optical paths of the returned beams from the optical recording medium, and controls at least one of the optical paths of the returned beams independently; and an optical block being in contact with the light control unit for allowing the emitted beams from the plurality of light sources to pass therethrough after having passed through the light control unit for guiding the optical paths of the emitted beams toward the optical recording medium, and diverging the optical paths of the returned beams from the optical recording medium from the optical paths of the emitted beams and guiding toward the light control unit; and wherein the optical block includes at least a first member, a second member, and a third member, the first and the second member is formed of a material having birefringent property, the third member is interposed between the first and the second members and formed of a material having lower refractive index than the first and the second members, the light control unit including a crystal thin plate having a plurality of refracting areas formed therein, the plurality of refracting areas which exhibit different refractive indexes from the surrounding area when a voltage is applied to a voltage application area, a pair of electrodes formed on the surfaces of the crystal thin plate so as to sandwich the crystal thin plate for applying a voltage to the voltage application area, and a first insulting member and a second insulating member for sandwiching the crystal thin plate so as to cover the electrodes.

2. A light receiving and emitting unit according to claim 1, wherein the light control unit is formed with holes respectively on the first insulating member and the second insulating member in the direction substantially perpendicular to the optical path of the returned beam, and a feeder member for feeding electricity to the respective electrodes is connected to the respective electrodes through these holes.

3. A light receiving and emitting unit according to claim 1, wherein the light control unit may be constructed in such a manner that the direction of the optical axis of the crystal thin plate coincides with the direction of voltage application, and is perpendicular to the direction of deflection of the light source.

4. A light receiving and emitting unit according to claim 1, wherein all the returned beams reflected from the optical recording medium travel along the identical optical path in the light control unit, the refracting area is constructed to have a lens effect, the light receiving element has a light receiving portion divided into four pieces, and the dividing direction is substantially 45 degrees with respect to the direction of deflection of the emitted beam from the light source.

5. A light receiving and emitting unit according to claim 1, wherein the pair of electrodes comprises a first electrode being in contact with the first insulating member and a second electrode being in contact with the second insulating member, and at least one of the combination of the first insulating member and the first electrode being in contact with each other and the combination of the second insulating member and the second electrode is formed of a transparent material.

6. A light receiving and emitting unit according to claim 5, wherein in the light control unit, at least one of the interface between the first insulating member and the crystal thin plate and the interface between the second insulating member and the crystal thin plate is formed at the position crossing the light flux of the returned beams from the optical recording medium, and the light receiving portion of the light receiving element has a parting line which is substantially parallel with the interface.

7. An optical pickup, in which a light condensing lens is built in the light receiving and emitting unit according to any one of claims 1 to 6, for collecting the beams emitted from the plurality of light sources onto the optical recording medium, and receiving the returned beams from the optical recording medium to perform recording and reproducing of the optical recording medium.

* * * * *